3,345,339
NOVEL POLYESTER PROCESS
Earl E. Parker, Allison Park, and John G. Baker, Cheswick, Pa., assignors to Pittsburgh Plate Glass Company, Pittsburgh, Pa., a corporation of Pennsylvania
No Drawing. Filed Dec. 20, 1963, Ser. No. 332,286
11 Claims. (Cl. 260—75)

This invention relates to the preparation of unsaturated polyesters. More particularly, it pertains to the preparation of unsaturated polyesters of a polyol, an aromatic polycarboxylic acid such as isophthalic acid or terephthalic acid, an alpha, beta-ethylenically unsaturated polycarboxylic acid and, optionally, a saturated polycarboxylic acid and/or aromatic polycarboxylic acid other than isophthalic acid and terephthalic acid, in the presence of an esterification catalyst.

Unsaturated polyesters have found widespread usage in the preparation of various types of reinforced laminates for use in such articles as fiber glass reinforced boats, fiber glass reinforced building panels, fiber glass reinforced furniture and the like; in chemical resistance coatings; commercial decorative coatings; in castings, such as bowling balls and the like; and for potting purposes. Unsaturated polyester resins are extremely adaptable for such purposes because of their good mechanical strength, thermal stability, chemical resistance, and good optical properties. A further advantage of unsaturated polyester resins resides in the commercial availability of the necessary ingredients and of the non-toxic nature of such ingredients.

Unsaturated polyesters generally contain a saturated polycarboxylic acid or an aromatic polycarboxylic acid such as phthalic anhydride, isophthalic acid, or terephthalic acid. Phthalic acid and its anhydride have been the most widely used aromatic polycarboxylic acid.

However, recent commercial development has increased the use of isophthalic acid. Unsaturated polyesters containing isophthalic acid have many properties superior to unsaturated polyesters containing phthalic acid. Isophthalic unsaturated polyesters have generally better heat distortion, flexural strength, impact strength, and chemical resistance. One disadvantage, however, of isophthalic-unsaturated polyesters resides in the generally poor color of such polyesters, or in the extremely long reaction time required to produce unsaturated isophthalic polyesters having good color. Conventional procedures for producing unsaturated isophthalic polyesters involves the esterification of a mixture of an unsaturated acid and isophthalic acid with a polyol.

Terephthalic acid, in contrast to phthalic and isophthalic acid, has found little application in unsaturated polyesters, primarily due to the difficulty of producing unsaturated terephthalic polyester resins. Conventional production methods for such polyesters involves the technique of ester interchange inasmuch as the direct esterification of terephthalic acid in the presence of an unsaturated polycarboxylic acid has not been feasible until this time.

However, it has now been discovered that unsaturated polyesters having excellent color can be prepared directly from isophthalic acid and/or terephthalic acid, a polyol, and an alpha, beta-ethylenically unsaturated polycarboxylic acid by utilization of an esterification catalyst in a two-stage process.

The novel two-stage process involves first the reaction of a part of the polyol ingredient with isophthalic acid or terephthalic acid in the presence of an esterification catalyst and in the substantial absence of an alpha, beta-ethylenically unsaturated polycarboxylic acid, and secondly, the reaction of an alpha, beta-ethylenically unsaturated polycarboxylic acid with the reaction product mixture of the first stage. It has been found that by the use of this two-stage process that unsaturated polyesters can be produced directly from terephthalic acid and that isophthalic acid and terephthalic acid containing unsaturated polyesters having excellent color can be produced in less time than by conventional techniques.

CATALYST

The efficiency of the above-mentioned two-stage process depends upon the utilization of an effective esterification catalyst. Inorganic tin salts, that is, stannous salts such as stannous halides, stannous acylates, and stannous alkoxides, and stannic salts, and organic tin compounds have been found to be particularly effective catalysts in this invention, the following compounds being illustrative:
(a) stannous salts, such as
    stannous hydroxide
    stannous bromide
    stannous chloride
    stannous fluoride
    stannous iodide
    stannous oxychloride
    stannous sulfate
    stannous oxide
    stannous acetate
    stannous laurate
    stannous octoate
    stannous oleate
    stannous oxalate
    stannous butoxide
    stannous 2-ethylhexoxide
    stannous phenoxide
    stannous cresoxides
    and the like;
(b) stannic salts, such as
    stannic chloride
    stannic bromide
    stannic fluoride
    stannic oxychloride
    and the like;
(c) dialkyltin salts of carboxylic acids, such as
    dibutyltin diacetate
    dibutyltin diluarate
    dibutyltin maleate
    dilauryltin diacetate
    dioctyltin diacetate
    and the like;
(d) dialkyltin chlorides, such as
    dibutyltin dichloride
    dioctyltin dichloride
    and the like;
(e) dialkyltin oxides, such as
    dibutyltin oxide
    dioctyltin oxide
    dilauryltin oxide
    and the like;
(f) trialkyltin hydroxides, such as
    trimethyltin hydroxide
    tributyltin hydroxide
    trioctyltin hydroxide
    and the like.

These catalysts have been found to be effective in amounts of about 0.05 percent by weight to about 1.0 percent by weight of the total weight of the charge in the first stage. Higher quantities of catalyst can be used if desired.

ACID COMPONENT

The unsaturated polyester resins of this invention are prepared from isophthalic acid and/or terephthalic acid and an alpha, beta-ethylenically unsaturated polycarboxylic acid. Such unsaturated acids include:

maleic acid
fumaric acid
itaconic acid
citraconic acid
glutaconic acid
mesaconic acid and the like, and their corresponding anhydrides where such anhydrides exist.

Optionally, other polycarboxylic acids may be utilized in addition to the above-mentioned acids. Such acids include saturated polycarboxylic acids, such as:

succinic acid
glutaric acid
adipic acid
pimelic acid
suberic acid
azelaic acid
sebacic acid and the like, and certain aromatic polycarboxylic acids and derivatives thereof, such as:

phthalic acid
tetrahydrophthalic acid
hexahydrophthalic acid
endomethylenetetrahydrophthalic anhydride
tetrachlorophthalic anhydride
hexachloroendomethylenetetrahydrophthalic acid and the like.

The optional acid component may be utilized in major amounts although they generally comprise a minor proportion of the acid components present in the polyesters produced by the method of this invention.

The term "acid" as used in this specification and appended claims includes the corresponding anhydrides, where such anhydrides exist.

POLYOL COMPONENT

Unsaturated polyesters produced by the method of this invention can be prepared from those polyols utilized in conventional processes. Such polyols include:

ethylene glycol
propylene glycol
butylene glycol
diethylene glycol
dipropylene glycol
triethylene glycol
neopentyl glycol
trimethylene glycol
polyethylene glycol
polypropylene glycol
1,5-pentanediol
trimethylolethane
trimethylolpropane
glycerol
1,2,6-hexanetriol
pentaerythritol
sorbitol
mannitol
methyl glycoside
2,2-bis(hydroxyethoxyphenyl)propane
2,2-bis(beta-hydroxypropoxyphenyl)propane and the like.

The above polyols are illustrative of polyols which can be utilized in the practice of this invention. Also, mixtures of the above polyols may be used.

Theoretically, one equivalent of polyol is utilized for each equivalent of acid. However, the polyol component is preferably used in an excess of up to 20 percent by weight, although even greater excesses may be utilized if desired.

The type of polyol utilized affects, to some degree, the final properties of the polyester. For example, the difunctional polyols, especially polypropylene glycol and the like, produce a more flexible polyester than do the more functional polyols, such as glycerol and the like.

ESTERIFICATION PROCEDURE

This invention comprises the preparation of unsaturated polyester resins in two stages. The first stage involves the reaction of a portion of the polyol component and an acid selected from the class consisting of isophthalic acid and terephthalic acid in the presence of one of the above-mentioned esterification catalysts and in the absence of any substantial quantity of alpha, beta-ethylenically unsaturated polycarboxylic acids. This first-stage reaction is carried out until a substantial quantity of isophthalic or terephthalic acid is reacted with the polyol component. This can be determined by determination of the acid number. The first stage is usually discontinued after an acid number of about 1 to about 40 is achieved.

The second stage of the novel process of this invention involves the addition of the alpha, beta-ethylenically unsaturated polycarboxylic acid component to the reaction mixture, and the continuation of heating until a desired acid number is achieved.

The equipment utilized for carrying out the novel method of this invention can be of a conventional type. The requisite equipment is a vessel which can be heated and is equipped with an agitator, reflux condenser, and a temperature measuring device. The first and second esterification stages may be conducted in apparatus similar to that illustrated in U.S. Patent 2,993,029. Also, the method of that patent may be utilized insofar as applicable, that is, both esterification reactions of the present invention may be conducted in the presence of a suitable solvent, such as xylene, toluene, and the like. Also, the reaction temperatures mentioned in that patent are applicable here as well, that is, temperatures of about 350° F. to about 450° F. are generally utilized in the preparation of the polyesters of this invention.

As indicated in the above-mentioned patent, the utilization of a glycol recovery system enhances the conservation of glycol and serves to retain the solvent from the reaction kettle. The glycol recovery system illustrated in the above patent may be utilized in the practice of the present invention.

The novel process of this invention may also be practiced in the absence of solvents wherein a rapid inert gas purge is used to remove water of reaction. A conventional glycol recovery system can be utilized with this non-solvent method.

Although produced by a new method, the unsaturated polyesters containing isophthalic acid and/or terephthalic acid are comparable or superior to such unsaturated polyesters prepared by other techniques.

One advantage of the present invention resides in the feasibility of producing water-white, isophthalic-unsaturated polyesters in a time comparable to that required for the production of phthalic-unsaturated polyesters. Another advantage of the instant invention resides in the feasibility of producing terephthalic-unsaturated polyester resins directly from terephthalic acid.

In the preparation of the isophthalic-unsaturated polyester resins of this invention, it has been found to be preferable to include a small amount of triphenyl phosphite or other bleaching agent. Although the polyesters used by the instant invention have far superior color to isophthalic polyesters produced by conventional means, the addition of a small amount of triphenyl phosphite during the esterification reaction has been found to improve even further the ultimate color of the polyester. Generally, about 0.1 percent by weight to about 0.5 percent by weight of triphenyl phosphite is utilized.

The novel process of this invention permits a fifteen (15) percent reduction in processing time of isophthalic-unsaturated polyesters when the esterification is carried out at conventional esterification temperatures. Furthermore, by conducting the esterification at temperatures lower than those customarily used, an isophthalic-unsaturated polyester having superior color can be produced by this invention. Each of these advantages is significant as neither advantage can be achieved by conventional processes.

The unsaturated polyesters containing isophthalic acid and/or terephthalic acid produced by the method of this invention can be thinned in a suitable reactive monomer in a manner similar to other unsaturated polyesters. Such monomers include:

styrene
alpha-methyl styrene
vinyl toluene
divinyl benzene
methyl methacrylate
diallylphthalate
dichlorostyrene
triallyl cyanurate and the like.

The following examples illustrate in detail the novel method of this invention. The examples are not intended to limit the invention, for there are, of course, numerous possible variations and modifications.

*Example I*

A series of polyesters was prepared by a two-stage process. Five polyesters were prepared in the presence of various catalysts while one polyester was prepared in the absence of a catalyst.

The following ingredients were used in each run:

| | Gram moles |
|---|---|
| Isophthalic acid | 5 |
| Propylene glycol | 11 |
| Maleic anhydride | 5 |

Each polyester was prepared by a similar method as the isophthalic acid and the propylene glycol were mixed and heated, in the presence of 0.1 percent by weight of catalyst where so indicated in the table below, in a vessel equipped with reflux condenser, temperature measuring device, and inert gas inlet, until an acid number of 25 was achieved. At that acid number maleic anhydride was added and cooking was continued at the temperature indicated in the below table, until an acid number of about 33 to about 39 was obtained.

The results of their various runs are tabulated in Table I.

by weight of dibutyl tin oxide in a reaction vessel equipped in the manner set out in Example I.

Esterification was conducted at 195° C. for 22 hours before an acid number of 38 and an alkyd viscosity of N— was attained. After the polyester had cooled to about 75° C., about 0.01 percent by weight of hydroquinone was added and the polyester was thinned with styrene in a 70/30 weight ratio. The resulting resin viscosity was Z4. The resin was hazy.

*Example III*

An unsaturated terephthalic polyester was prepared by a two-stage technique.

| | Moles |
|---|---|
| Terephthalic acid | 6 |
| Propylene glycol | 11.5 |

The above ingredients were admixed with 0.1 percent by weight of dibutyl tin oxide in a reaction vessel equipped in the manner set out in Example I.

After the mixture was heated for 17 hours at 195° C., an acid number of 20 was attained. Four moles of maleic anhydride were added and esterification continued for about 15 additional hours. An acid number of 6.45 and an alkyd viscosity of T+ was obtained.

After 0.015 percent by weight of hydroquinone was added, the polyester was thinned in styrene in a 65/35 weight ratio. Final resin viscosity was V.

*Example IV*

For purposes of comparison, an attempt was made to prepare an unsaturated terephthalic polyester by a one stage process.

| | Moles |
|---|---|
| Terephthalic acid | 6 |
| Maleic anhydride | 4 |
| Propylene glycol | 11.5 |

The above ingredients were admixed with 0.1 percent by weight of dibutyl tin oxide in a reaction vessel equipped in the manner set out in Example I. This admixture was heated at about 195° C. for a period of about 53 hours. The terephthalic acid was not reacted sufficiently to give a clear solution. It was not possible to get a true alkyd viscosity and acid number. The reaction was not continued as it was concluded that typical esterification could not be completed within a reasonable time.

Although specific examples of the invention have been set forth hereinabove, it is not intended that the invention be limited solely thereto, but to include all of the variations and modifications falling within the scope of the appended claims.

TABLE I

| Resin | Catalyst | Cooking Temp., °C. | Time for 1st Stage, hours | Total Time, hours | Final Acid No. | Alkyd[1] Vis. | Color |
|---|---|---|---|---|---|---|---|
| Control | None | 210 | 8.5 | 13.3 | 33.8 | Q— | Poor. |
| A | Dibutyl tin oxide | 210 | 7.5 | 11.8 | 33.8 | N+ | Good. |
| B | Stannous chloride | 210 | 5.5 | 10.2 | 34.8 | O— | Do. |
| Control | None (Average of two resins) | 195 | 18.3 | 24.2 | 40.7 | O | Poor. |
| C | Stannous oxalate | 195 | 4.8 | 13.5 | 33.0 | N | Good. |
| D[2] | Dibutyl tin oxide (Average of three resins) | 195 | 9.7 | 15.5 | 35.4 | O | Excellent. |

[1] Alkyd viscosity is determined by measuring the Gardner-Holdt viscosity of a solution of the polyester at 60 percent solids in the monoethyl ehter of ethylene glycol.
[2] Sample D has 0.5 percent by weight of triphenyl phosphite present during the esterification reaction.

*Example II*

For purposes of comparison, an unsaturated isophthalic was prepared by a one-stage process.

| | Moles |
|---|---|
| Isophthalic acid | 5 |
| Maleic anhydride | 5 |
| Propylene glycol | 12 |

The above ingredients were admixed with 0.1 percent

We claim:

1. A method of preparing unsaturated polyesters comprising (1) reacting to an acid number in the range of 1 to 40, a mixture consisting essentially of a saturated polyol, and an aromatic polycarboxylic acid selected from the class consisting of isophthalic acid and terephthalic acid in the presence of an esterification catalyst which is a tin compound and (2) subsequently esterifying the reaction product mixture of stage (1) with an alpha, beta-ethylenically unsaturated polycarboxylic acid, there being utilized at least about one equivalent of polyol per equivalent of acid reactants.

2. The method of claim 1 wherein the alpha, beta-ethylenically unsaturated polycarboxylic acid is selected from the class consisting of maleic acid, fumaric acid, and itaconic acid.

3. The method of claim 2 wherein the polyol is selected from the class consisting of ethylene glycol, propylene glycol, butylene glycol, diethylene glycol, 2,2-bis(4 - hydroxyethoxyphenyl)propane, 2,2 - bis(4 - [beta-hydroxypropoxy]phenyl)propane, dipropylene glycol, triethylene glycol, glycerol, neopentyl glycol and pentaerythritol.

4. A method of preparing an unsaturated isophthalic polyester comprising (1) reacting to an acid number range of 1 to 40, a mixture consisting essentially of a saturated polyol and isophthalic acid in the presence of an esterification catalyst which is a tin compound and (2) subsequently esterifying the reaction product mixture of stage (1) with an alpha, beta-ethylenically unsaturated polycarboxylic acid, there being utilized at least about one equivalent of polyol per equivalent of acid reactants.

5. The method of claim 4 wherein the polyol is selected from the class consisting of ethylene glycol, propylene glycol, butylene glycol, diethylene glycol, 2,2-bis(4-hydroxyethoxyphenyl)propane, 2,2 - bis(4-[beta-hydroxypropoxy]phenyl)propane, dipropylene glycol, glycerol, neopentyl glycol, and pentaerythritol.

6. The method of claim 5 wherein the alpha, beta-ethylenically unsaturated polycarboxylic acid is maleic acid.

7. The method of claim 6 wherein the ratio of the number of equivalents of polyol reactant to the number of equivalents of acid reactants is in the range of about 1:1 to about 1:2.

8. A method of preparing an unsaturated terephthalic polyester comprising (1) reacting to an acid number range of 1 to 40, a mixture consisting essentially of a unsaturated polyol and terephthalic acid in the presence of an esterification catalyst which is a tin compound and (2) subsequently esterifying the reaction product mixture of stage (1) with an alpha, beta-ethylenically unsaturated polycarboxylic acid, there being utilized at least about one equivalent of polyol per equivalent of acid reactants.

9. The method of claim 8 wherein the polyol is selected from the class consisting of ethylene glycol, propylene glycol, butylene glycol, diethylene glycol, 2,2-bis(4 - hydroxyethoxyphenyl)propane, 2,2 - bis(4[beta-hydroxypropoxy]phenyl) propane, dipropylene glycol, glycerol, neopentyl glycol, and pentaerythritol.

10. The method of claim 9 wherein the alpha, beta-ethylenically unsaturated polycarboxylic acid is maleic acid.

11. The method of claim 10 wherein the ratio of the number of equivalents of polyol reactant to the number of equivalents of acid reactants is in the range of about 1:1 to about 1:2.

References Cited

UNITED STATES PATENTS

| | | | |
|---|---|---|---|
| 2,280,242 | 4/1942 | Kropa et al. | 260—860 |
| 2,839,492 | 6/1958 | Caldwell et al. | 260—75 |

FOREIGN PATENTS

| | | |
|---|---|---|
| 577,788 | 6/1959 | Canada. |

SAMUEL H. BLECH, *Primary Examiner.*

R. T. LYON, *Assistant Examiner.*

UNITED STATES PATENT OFFICE
CERTIFICATE OF CORRECTION

Patent No. 3,345,339　　　　　　　　　　　　October 3, 1967

Earl E. Parker et al.

It is hereby certified that error appears in the above numbered patent requiring correction and that the said Letters Patent should read as corrected below.

Column 8, lines 5 and 6, for "unsaturated" read -- saturated --.

Signed and sealed this 29th day of October 1968.

(SEAL)
Attest:

Edward M. Fletcher, Jr.　　　　　　　　　　EDWARD J. BRENNER
Attesting Officer　　　　　　　　　　　　　Commissioner of Patents